United States Patent
Moniz et al.

(10) Patent No.: US 10,891,663 B2
(45) Date of Patent: Jan. 12, 2021

(54) PROVIDING COUPONS BASED ON INFORMATION ASSOCIATED WITH CONTENT PROVIDERS

(71) Applicant: Facebook, Inc., Menlo Park, CA (US)

(72) Inventors: Ryan Joseph Moniz, Mountain View, CA (US); Yizhaq Ezra, Berkeley, CA (US); Catherine Corinne Dennig, San Francisco, CA (US); Yuan Xia, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 446 days.

(21) Appl. No.: 15/640,312

(22) Filed: Jun. 30, 2017

(65) Prior Publication Data
US 2019/0005552 A1 Jan. 3, 2019

(51) Int. Cl.
*G06Q 30/02* (2012.01)
*G06N 20/00* (2019.01)

(52) U.S. Cl.
CPC ......... *G06Q 30/0277* (2013.01); *G06N 20/00* (2019.01); *G06Q 30/0239* (2013.01); *G06Q 30/0273* (2013.01)

(58) Field of Classification Search
CPC combination set(s) only.
See application file for complete search history.

(56) References Cited

U.S. PATENT DOCUMENTS

| 10,192,243 | B1 * | 1/2019 | Genc-Kaya | ........ G06Q 30/0273 |
| 2011/0047019 | A1 * | 2/2011 | Cervenka | ............... G06Q 30/06 705/14.26 |
| 2011/0055000 | A1 * | 3/2011 | Zhang | .................... G06N 20/00 705/14.43 |
| 2011/0082756 | A1 * | 4/2011 | Eisnor | .................... G06Q 30/02 705/14.69 |

(Continued)

FOREIGN PATENT DOCUMENTS

| CN | 106415639 A | * | 2/2017 | ......... G06Q 30/0277 |
| WO | WO-2018170593 A1 | * | 9/2018 | ......... G06Q 30/0242 |

OTHER PUBLICATIONS

Dua, Tanya, "Marketing on Snapchat: Snapchat is wooing ad buyers with discount coupons and bonuses", May 24, 2017. (Year: 2017).*

(Continued)

*Primary Examiner* — Marie P Brady
(74) *Attorney, Agent, or Firm* — Fenwick & West LLP (57) ABSTRACT

Information associated with a content provider within an online system can be acquired. The information can include data about interactions performed by the content provider. A machine learning model can be applied to the information. A metric indicating a predicted likelihood that the content provider will perform an action related to a content item when the content provider is presented with a coupon for the content item can be determined. It can be determined that the metric satisfies specified threshold criteria. An opportunity to present the coupon to the content provider can be detected. The coupon and a communication can be provided (Continued)

to the content provider at the opportunity. The communication can encourage the content provider to perform the action related to the content item. An instruction to execute the action can be acquired from the content provider. The content item can be provided to users of the online system.

14 Claims, 4 Drawing Sheets

(56) References Cited

U.S. PATENT DOCUMENTS

| | | | | |
|---|---|---|---|---|
| 2011/0282943 | A1* | 11/2011 | Anderson | G06Q 10/107 709/204 |
| 2014/0324604 | A1* | 10/2014 | Munoz Torres | G06Q 30/0276 705/14.72 |
| 2014/0358672 | A1* | 12/2014 | Sim | G06Q 30/0246 705/14.45 |
| 2015/0163311 | A1* | 6/2015 | Heath | G06Q 30/0236 709/204 |
| 2016/0210657 | A1* | 7/2016 | Chittilappilly | G06Q 30/0246 |
| 2017/0178180 | A1* | 6/2017 | Stanley | G06Q 30/0244 |

OTHER PUBLICATIONS

Schlosser, Rainer, "Joint Stochastic Dynamic Pricing and Advertising With Time-Dependent Demand", Elsevier, Journal of Economic Dynamics & Control, 73 (2016), p. 439-452 (Year: 2016).*

* cited by examiner

PROVIDING COUPONS BASED ON INFORMATION ASSOCIATED WITH CONTENT PROVIDERS

BACKGROUND

This disclosure relates generally to online systems, and in particular, to providing coupons based on information associated with content providers within online systems.

An online system, such as a social networking system, can allow its users to connect to and to communicate with other online system users. Via the online system, users can create profiles or accounts that are tied to their identities and that include information about the users, such as interests and demographic data. The users may be individuals (e.g., people) or entities (e.g., corporations, organizations). Because of the increasing popularity of online systems and the increasing amount of user-specific information maintained by online systems, online systems can provide an ideal forum for content providers to increase awareness about products or services by presenting content items to online system users.

Presenting content items to users of an online system can allow a content provider to promote products, services, opinions, and/or causes. Often times, while providing content items via online systems can be costly for content providers, it can still be overall beneficial for them to provide the content, such as due to potential increases in revenue gained from providing the content. However, under conventional approaches specifically arising in the realm of computer technology, it can be difficult for an online system to encourage or persuade content providers to provide or present content to users of the online system.

SUMMARY

An online system, such as a social networking system, can be utilized by a plurality of users. Users of the online system can be content providers who provide content, such as text, images, video, audio, and/or advertisements, etc. Users of the online system can also access, consume, view, engage with, and/or otherwise interact with content made available by content providers. For example, a content provider such as an advertiser can spend money in order to present, publish, post, and/or provide an advertisement via the online system for other users of the online system to view, engage with, and/or otherwise access. However, in some instances, it can be challenging for the online system to encourage or persuade content providers to spend money in order to present or provide their content items via the online system. Various embodiments of the present disclosure can attempt to encourage content providers to take action (e.g., a spending action) with respect to providing content items by offering coupons for actions taken in connection with providing content items via the online system.

In some implementations, the online system can acquire information associated with a content provider within the online system. The online system can, for example, acquire information including data about one or more interactions performed by the content provider. In one instance, the content provider can be an admin or a manager of a resource, such as a page, within the online system. The information associated with the content provider can include data about the page admin's activities or engagements. In this instance, the information can include data about one or more previous expenditures made by the page admin, such as monetary compensation paid to the online system by the page admin in order to provide one or more previous content items for promoting the page and/or a product, a service, a brand, etc., associated with the page.

In some embodiments, the online system can apply a machine learning model to the information associated with the content provider. The online system can utilize the information associated with the content provider as input to the machine learning model. For instance, based on the information associated with the content provider, the online system can acquire, identify, and/or otherwise extract one or more features (e.g., attributes, properties, and/or characteristics associated with the content provider) to be inputted into the machine learning model. Based on applying the machine learning model, the online system can determine a metric, such as a confidence score, that measures or indicate a predicted likelihood that the content provider will perform an action related to a content item when the content provider is presented with a coupon for the content item. In one example, the action can correspond to a purchase, bid, or spending action related to providing the content item, such as an advertisement, within the online system. The action can be associated with a cost to the content provider, such as monetary compensation paid by the content provider to the online system in order to publish, present, or provide the content item (e.g., advertisement) via the online system. In order to encourage or incentivize the content provider to perform the action, the coupon can provide a promotional value applicable to the cost. In one example, the coupon can provide the promotional value in the form of a discount (e.g., absolute amount or percentage amount) to the cost. In another example, the coupon can provide the promotional value in the form of additional free monetary value usable on the action when the content provider covers the cost.

Moreover, the online system can determine, detect, or identify when the metric satisfies specified threshold criteria. The online system can, for example, determine that a confidence score measuring how likely the content provider will take action with respect to providing the content item at least meets a specified confidence threshold level. The online system can also detect an opportunity to present the coupon to the content provider via the online system. In one instance, the online system can detect that a post associated with the content provider (or associated with a page managed by the content provider) has reached a specified threshold level of engagement/interaction (e.g., likes, reactions, shares, comments, etc.) from users of the online system. In another instance, the online system can detect that the content provider has decided to create or generate the content item to be provided to users of the online system. The online system can then provide the coupon and a communication (e.g., a message, a notification, etc.) to the content provider at the opportunity. The communication can be in the form of an image, a video, audio, and/or text, etc. The communication can encourage the content provider to perform the action related to the content item. For instance, the communication can inform the content provider that the coupon is applicable if the content provider decides to take an action with respect to the content item.

The content provider can decide to take action with respect to the content item. As such, the online system can acquire from the content provider an instruction to execute the action related to the content item (e.g., a spending action to publish, post, present, and/or provide the content item within the online system). Further, based on the instruction to execute the action, the online system can publish, post, present, and/or otherwise provide the content item to at least one user of the online system.

It should be appreciated that many other features, applications, embodiments, and/or variations of the disclosed technology will be apparent from the accompanying drawings and from the following description. Additional and/or alternative implementations of the structures, systems, non-transitory computer readable media, and methods described herein can be employed without departing from the principles of the disclosed technology.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
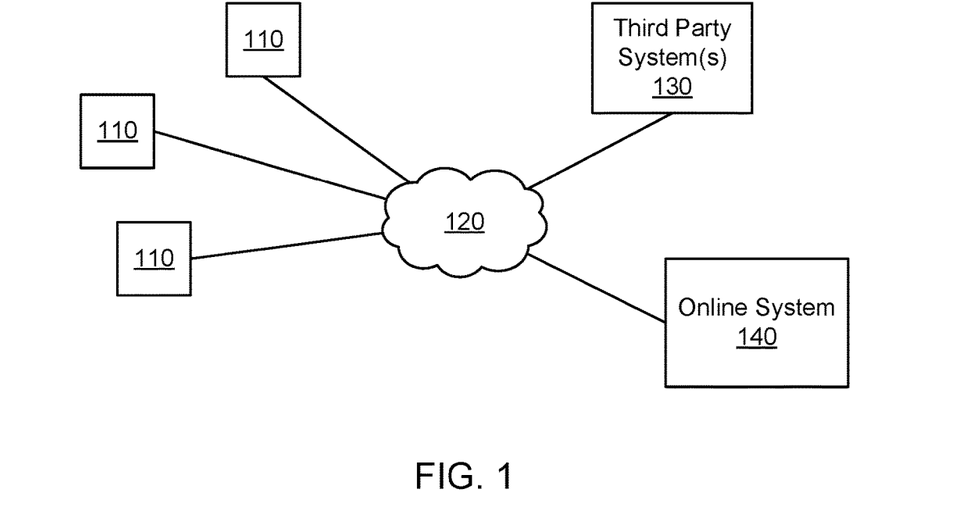
FIG. 1 illustrates a block diagram of an example system environment in which an example online system operates, in accordance with an embodiment.

FIG. 1 illustrates a block diagram of an example system environment 100 in which an example online system 140 operates, in accordance with an embodiment. The example system environment 100 shown in FIG. 1 can comprise one or more client devices 110, a network 120, one or more third party systems 130, and the online system 140. In alternative configurations, different and/or additional components may be included in and/or removed from the system environment 100. In some cases, the online system 140 can, for example, be a social networking system, a content sharing network, and/or another system for providing content to users of the system, etc.

The client devices 110 can be one or more computing devices or systems capable of receiving user input as well as transmitting and/or receiving data via the network 120. In one implementation, a client device 110 is a conventional computer system, such as a desktop or a laptop computer. Alternatively, a client device 110 may be a device having computer functionality, such as a personal digital assistant (PDA), a mobile telephone, a smartphone, a wearable device, or another suitable device. A client device 110 can be configured to communicate via the network 120. In one embodiment, a client device 110 executes an application allowing a user of the client device 110 to interact with the online system 140. For example, a client device 110 can execute an application provided by the online system or a browser application in order to enable interaction between the client device 110 and the online system 140 via the network 120. In another embodiment, a client device 110 can interact with the online system 140 through an application programming interface (API) running on a native operating system of the client device 110, such as IOS® or ANDROID™. It should be understood that many variations are possible.

The client devices 110 can be configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 can include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

Moreover, one or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on a client device 110. In other embodiments, a third party system 130 provides content or other information for presentation via a client device 110. A third party system 130 may also communicate information to the online system 140, such as advertisements, content, or information about an application provided by the third party system 130. In some implementations, a third party system 130 can be a content provider, such as an advertiser, within the online system 140. For example, the content provider can correspond to an admin or manager of a resource, such as a page, within the online system. Many variations associated with the disclosed technology are possible.

Figure 2:
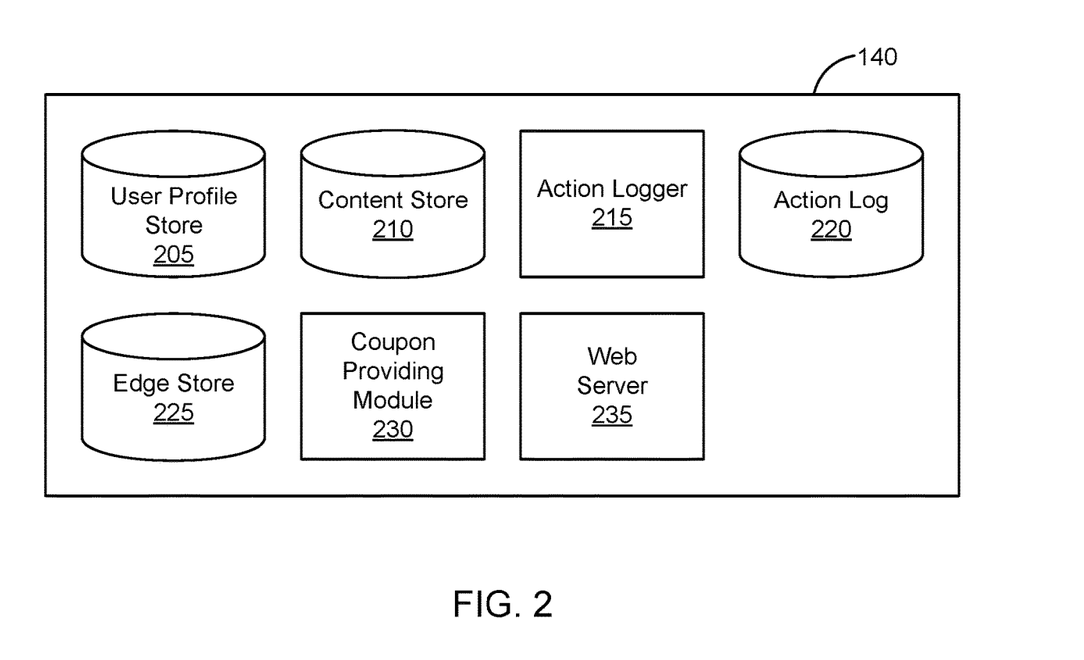
FIG. 2 illustrates a block diagram of an example online system, in accordance with an embodiment.

FIG. 2 illustrates a block diagram of an example online system 140, in accordance with an embodiment. The online system 140 shown in FIG. 2 can include a user profile store 205, a content store 210, an action logger 215, an action log 220, an edge store 225, a coupon providing module 230, and a web server 235. In some embodiments, the online system 140 may include additional, fewer, or different components/modules for various applications. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, modules can be implemented, in part or in whole, as software running on one or more computing devices or systems, such as on a user or client computing device. For example, a module or at least a portion thereof can be implemented as or within an application (e.g., app), a program, an applet, or an operating system, etc., running on a user computing device or a client/user computing system. In another example, a module or at least a portion thereof can be implemented using one or more computing devices or systems which can include one or more servers, such as network servers or cloud servers. In some instances, a module can, in part or in whole, be implemented within or configured to operate in conjunction with the online system 140, such as a social networking system (or service). Moreover, conventional components such as network interfaces, security functions, load balancers, failover servers, management and network operations consoles, etc., are not explicitly shown so as to not obscure the details of the system architecture.

Each user of the online system 140 is associated with a user profile, which is stored in the user profile store 205. A user profile may include declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third party applications or third party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

In some cases, one or more content items included in the content store 210 include content for presentation to a user and a bid amount. The content can be text, image, audio, video, or any other suitable data presentable to a user. In various embodiments, the content also specifies a page of content. For example, a content item can include a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, and/or if any suitable condition is satisfied when content in the content item is presented to a user. For example, the bid amount included in a content item specifies a monetary amount that the online system 140 receives from a user (e.g., a content provider) who provided the content item to the online system 140 if content in the content item is displayed. In some embodiments, the expected value to the online system 140 of presenting the content from the content item may be determined by multiplying the bid amount by a probability of the content of the content item being accessed by a user.

In various embodiments, a content item includes various components capable of being identified and retrieved by the online system 140. Example components of a content item include a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items may include an objective identifying an interaction that a user associated with a content item desires other users to perform when presented with content included in the content item. Example objectives include installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Further, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In various embodiments, the content store 210 includes multiple campaigns, which each include one or more content items. In various embodiments, a campaign in associated with one or more characteristics that are attributed to each content item of the campaign. For example, a bid amount associated with a campaign is associated with each content item of the campaign. Similarly, an objective associated with a campaign is associated with each content item of the campaign. In various embodiments, a user providing content items to the online system 140 provides the online system 140 with various campaigns each including content items having different characteristics (e.g., associated with different content, including different types of content for presentation), and the campaigns are stored in the content store.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identify users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 can be uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

Furthermore, the coupon providing module 230 can be configured to facilitate acquiring information associated with a content provider within an online system 140. The information associated with the content provider can include data about one or more interactions performed by the content provider, such as one or more previous expenditures (if any) made by the content provider for any previous advertising. The coupon providing module 230 can be configured to apply a machine learning model to the information associated with the content provider. For instance, one or more features can be extracted or acquired from the information associated with the content provider and utilized as input to the machine learning model. The coupon providing module 230 can determine, based on applying the machine learning model, a metric indicating a predicted likelihood that the content provider will perform an action related to a content item when the content provider is presented with a coupon for the content item. The action can be associated with a cost to the content provider and the coupon can provide a promotional value (e.g., discount, free monetary value, etc.) applicable to the cost.

In some cases, the coupon providing module 230 can determine that the metric satisfies specified threshold criteria, such as a specified minimum score/level. The coupon providing module 230 can be further configured to facilitate detecting an opportunity to present the coupon to the content provider via the online system. At the opportunity, the coupon providing module 230 can provide the coupon and a communication to the content provider. The communication can, for example, correspond to a message that persuades or encourages the content provider to perform the action related to the content item. Subsequently, if the content provider decides to take action, an instruction to execute the action related to the content item can be received, obtained, and/or otherwise acquired by the coupon providing module 230 from the content provider. Based on the instruction to execute the action, the coupon providing module 230 can provide the content item to at least one user of the online system. More details regarding the coupon providing module 230 are provided below with reference to FIG. 3. It should also be understood that many variations are possible. For instance, it should be appreciated that, in some embodiments, one or more functions of the coupon providing module 230 can be performed by other modules/components of the online system 140. Also, in some implementations, the coupon providing module 230 can perform one or more functions of another component(s)/module(s) associated with the online system 140.

Additionally, the web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as JOS®, ANDROID™, or Blackberry OS.

Figure 3:
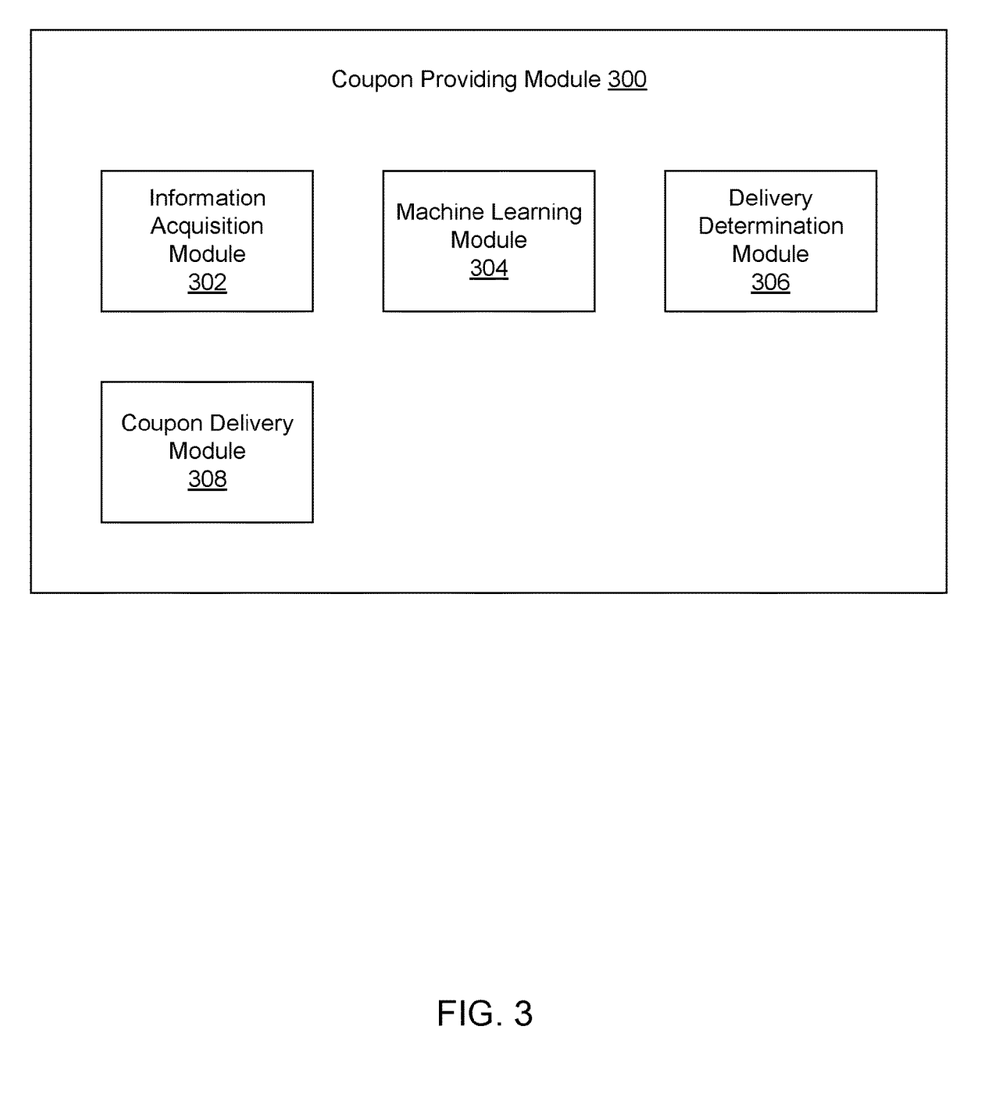
FIG. 3 illustrates a block diagram of an example coupon providing module, in accordance with an embodiment.

FIG. 3 illustrates a block diagram of an example coupon providing module 300, in accordance with an embodiment. In some embodiments, the example coupon providing module 300 can be implemented as the coupon providing module 230, described above. As shown in the example of FIG. 3, the example coupon providing module 300 can include an information acquisition module 302, a machine learning module 304, a delivery determination module 306, and a coupon delivery module 308.

The information acquisition module 302 can be configured to facilitate receiving, obtaining, and/or otherwise acquiring various types of information. In some embodiments, the information acquisition module 302 can acquire information associated with a content provider within an online system, such as a social networking system. The information associated with the content provider can include data about one or more interactions performed by the content provider. For example, the content provider can be an advertiser utilizing a social networking system. In this example, the content provider can also be an admin or manager of a page within the social networking system. The page admin can perform one or more interactions related to the page, such as by publishing/sharing content items associated with the page and/or by liking/reacting to/commenting on other posts while representing the page. Also, in some cases, the page admin may have previously made one or more expenditures on one or more content items (e.g., ad requests) via the social networking system, such as to advertise products, services, and/or brands, etc., associated with the page. Accordingly, in this example, the one or more interactions can include the publishing/posting of content items, the sharing of content items, the liking of content items, the reactions to content items, the comments on content items, and/or the expenditures on content items (e.g., ad requests). In some instances, the information associated with the content provider can include a score representing a likelihood that the content provider intends to advertise. The score can be generated, calculated, and/or determined by the online system 140. It should be appreciated that many variations are possible.

The machine learning module 304 can be configured to facilitate applying a machine learning model to the information associated with the content provider. The machine learning module 304 can extract, identify, and/or otherwise acquire one or more features based on the information associated with the content provider. In some cases, the one or more features can be associated with attributes, characteristics, and/or properties of the content provider, which can include attributes, characteristics, and/or properties associated with the one or more interactions performed by the content provider. The machine learning module 304 can then apply the machine learning model (i.e., a coupon model) to the one or more features. For instance, the one or more features can be inputted into the coupon model.

Based on applying the machine learning model, the machine learning module 304 can also be configured to generate, calculate, and/or otherwise determine a metric indicating a predicted likelihood that the content provider will perform an action related to a content item when the content provider is presented with a coupon for the content item. For example, the machine learning module 304 can input the one or more features into the coupon model to produce a confidence score. The confidence score can measure or predict how likely an advertiser will take action regarding a potential advertisement (e.g., a spending action to enable the advertisement to be provided/presented to users via the online system) when the online system offers the advertiser a coupon that is usable for the potential advertisement. Moreover, the action can be associated with a cost to the content provider, while the coupon can provide a promotional value applicable to the cost. Continuing with the example, the spending action (i.e., expenditure) by the advertiser is associated with a (monetary) spending amount to be paid by the advertiser to the online system. In some cases, the coupon offered by the online system to the advertiser can provide a discount to the spending amount to be paid by the advertiser (e.g., a $10,000 discount or a 10% discount). In some instances, the coupon can provide a free monetary value to be spent on the advertisement, in addition to the value of the spending amount paid by the advertiser (e.g., get $1,000 upon spending $10,000). Additionally, in some implementations, the action corresponds to a spending action related to advertising the advertisement via the online system, the cost is associated with a spending amount for advertising the advertisement, and the promotional value provides a decrease to the cost without decreasing the spending amount and/or an increase to the spending amount without increasing the cost. In one example, the spending amount is capable of being increased by the content provider but incapable of being decreased by the content provider without decreasing the promotional value. It should be understood that the examples herein are provided for illustrative purposes and that there can be many variations associated with the disclosed technology.

Moreover, the machine learning model or coupon model can be built, developed, generated, and/or refined by the machine learning module 304. For instance, the machine learning model or coupon model can be trained or developed (e.g., to at least a specified threshold accuracy level) prior to being utilized to calculate or determine metrics for content providers. In some embodiments, the machine learning module 304 can be configured to facilitate acquiring information associated with a plurality of content providers. The machine learning module 304 can extract, acquire, identify, and/or determine a set of one or more features based on the information associated with the plurality of content providers. In some cases, the set of one or more features can be extracted or acquired based on engagement data (e.g., interactions, likes, reactions, posts, comments, shares, etc.) associated with the plurality of content providers, expenditure data (e.g., previous spending actions/habits/behaviors, scores representing how likely the content providers intend to advertise, etc.) associated with the plurality of content providers, page data associated with the plurality of content providers (when the content providers are page admins/managers), and/or other data. The machine learning module 304 can then train, build, develop, generate, and/or refine the machine learning model (i.e., the coupon model) based on the set of one or more features.

As part of the training, generation, development, and/or refinement of the machine learning model or the coupon model, the machine learning module 304 can form or acquire training data (e.g., the set of one or more features), such as by identifying a set of positive training data that have been determined based on manual effort or automatic approaches to have certain property(ies) in question. For instance, the set of positive training data can include features associated with content providers who have been identified, labeled, or determined based on review to have positive correlations with certain actions (e.g., spending actions). Additionally or alternatively, in some embodiments, the machine learning module 304 can form or acquire a set of negative training data that lack the property(ies) in question. For example, the set of negative training data can include features associated with other content providers who have been determined based on review to have negative correlations with certain actions.

As discussed, the machine learning module 304 can extract or acquire features (including feature values) from the training data, the features being variables deemed potentially relevant to whether or not the data has the associated property(ties) in question. Specifically, the features extracted or acquired by the machine learning module 304 can, for example, be associated with engagement/interaction data, expenditure data, page data, user data (e.g., attributes related to content providers), content data (e.g., attributes related to a product/service being promoted in an advertisement, attributes related to the advertisement, etc.), and/or other data that have been logged, recorded, or stored. It should be understood that these features are provided as examples for illustrative purposes and that many variations are possible. Further, in some cases, an ordered list of the features can be herein referred to as the feature vector. In one embodiment, the machine learning module 304 applies dimensionality reduction (e.g., via linear discriminant analysis (LDA), principle component analysis (PCA), etc.) to reduce the amount of data in the feature vectors to a smaller, more representative set of data.

In some implementations, the machine learning module 304 uses supervised machine learning to train the machine learning model (e.g., the coupon model), with the feature vectors of the positive training set (and/or of the negative training set) serving as the inputs. Different machine learning techniques, such as linear support vector machine (linear SVM), boosting for other algorithms (e.g., AdaBoost), neural networks, logistic regression, naïve Bayes, memory-based learning, random forests, bagged trees, decision trees, boosted trees, and/or boosted stumps, may be used alone or in combination in various embodiments. The coupon model, when applied to a feature vector extracted or acquired from information associated with a content provider, outputs an indication of whether the content provider will likely take action with respect to a content item when presented with a coupon for that content item. In one instance, the coupon model can output a Boolean yes/no estimate of whether a potential advertiser will likely proceed with a spending action to generate an advertisement when a coupon for the advertisement is provided. In another instance, the coupon model can output a scalar value representing a probability/likelihood that the potential advertiser will likely proceed with the spending action when presented with the coupon. Again, many variations are possible.

In some embodiments, a validation set (e.g., test set) is formed from additional content provider information, other than those in the training set(s), which have already been determined to have, or to lack, the property(ies) in question. The machine learning module 304 can apply the trained coupon model (or machine learning model) to the validation set to quantify the accuracy of the coupon model. Common metrics applied in accuracy measurement include: Precision=TP/(TP+FP) and Recall=TP/(TP+FN), where precision is how many instances the coupon model correctly predicted (TP or true positives) out of the total it predicted (TP+FP, or true positives+false positives), and recall is how many instances the coupon model correctly predicted (TP) out of the total number that did have the property(ies) in question (TP+FN, or true positives+false negatives). The F-score (F-score=2*PR/(P+R)) unifies precision and recall into a single measure. In one embodiment, the machine learning module 304 iteratively re-trains the coupon model until the occurrence of a stopping condition, such as the accuracy measurement indication that the model is sufficiently accurate, or a number of training rounds having taken place, etc. It should be appreciated that there can be many variations associated with the disclosed technology.

Additionally, based on applying the machine learning model (i.e., coupon model), the machine learning module 304 can facilitate determining a promotional value provided by the coupon. In some embodiments, the machine learning module 304 can train or refine the machine learning model to predict or estimate an optimal promotional value. For example, the optimal promotional value can be at least one of: a value that results in the highest likelihood that a content provider will take action when presented with the coupon, a value that results in the highest predicted revenue for the content provider, a value that results in the highest predicted revenue for the online system, a value that results in the highest predicted revenues for the content provider and the online system, and/or any combination(s) thereof. Again, many variations are possible. For instance, in some cases, the promotional value can be set or specified by the online system, such as via a default setting or via manual input.

Further, in some implementations, based on applying the machine learning model (i.e., coupon model), the machine learning module 304 can determine another metric indicating another predicted likelihood that the content provider will perform the action even when the cost associated with the action is greater than the promotional value provided by the coupon. The machine learning module 304 can, for example, train or refine the machine learning model to determine predicted likelihoods that content providers will spend more than the promotional value of the coupons provided to them. In one instance, the coupon can be for an additional $100 usable on an advertisement when an advertiser spends $1,000 on the advertisement. In this instance, the machine learning module 304 can utilize the machine learning model to predict which advertisers will spend more than $1,000 when presented with the $100 coupon. Again, it should be appreciated that there can be many variations associated with the disclosed technology.

As discussed previously, the machine learning module 304 can generate, calculate, and/or determine a metric (e.g., a confidence score) indicating a predicted likelihood that the content provider will take action on a content item when presented with a coupon for the content item. In some implementations, the delivery determination module 306 can be configured to facilitate determining that the metric satisfies specified threshold criteria. In some cases, the delivery determination module 304 can determine that the metric satisfies the specified threshold criteria when the metric at least meets a minimum/threshold value. The metric can, for instance, correspond to a confidence score for predicting how likely an advertiser will proceed with an expenditure for an advertisement when a coupon for the advertisement is offered. In one example, the delivery determination module 304 determines that the metric satisfies the specified threshold criteria by determining that the confidence score at least meets a specified minimum/threshold confidence value or level (e.g., 75% confidence level, 90% confidence level, etc.). In another example, the delivery determination module 306 determines that the metric satisfies the specified threshold criteria when the confidence score for the advertiser is determined to be among a specified quantity of highest ranked confidence scores (e.g., top 5,000 highest confidence scores for advertisers, top 10% of highest confidence scores for advertisers, etc.) out of a plurality of confidence scores including those associated with other advertisers. As discussed previously, many variations associated with the disclosed technology are possible.

Moreover, the delivery determination module 306 can be configured to facilitate detecting an opportunity to present the coupon to the content provider via the online system. In some embodiments, the delivery determination module 306 can detect the opportunity by detecting a command from the content provider to create the content item via the online system. For instance, the delivery determination module 306 can decide to offer, present, or provide the coupon to an advertiser when the advertiser decides to create an advertisement. In some implementations, the delivery determination module 306 can detect the opportunity by detecting that another content item provided by the content provider at least meets a threshold level of user engagement within the online system. For example, when a content item (e.g., a post) published, shared, or otherwise provided by a page admin (who is an advertiser or a potential advertiser) receives at least a specified amount of user interaction (e.g., likes, reactions, comments, and/or shares, etc.) within a social networking system, the delivery determination module 306 can decide to offer, present, or provide the coupon to the page admin in attempt to persuade or encourage the page admin to proceed with an advertisement, such as for promoting the content item (e.g., the post) published, shared, or otherwise provided by the page admin.

Furthermore, the coupon delivery module 308 can be configured to facilitate delivering, presenting, or providing the coupon and a communication (e.g., a message, a notification, etc.) to the content provider at the opportunity detected by the delivery determination module 306. The communication can encourage the content provider to perform the action related to the content item. In some implementations, the coupon delivery module 308 can provide the communication in the form of an image, a video, audio, and/or text, etc. The communication can also inform the content provider of various statistics, estimations, projections, and/or other information. For instance, the coupon delivery module 308 can provide the communication to inform the content provider that taking action with respect to the content item (e.g., an advertisement) can increase the content provider's revenue by a projected/estimated amount.

In some embodiments, the coupon delivery module 308 can also facilitate delivering, presenting, or providing a preview of a potential content item. The coupon delivery module 308 can be configured to provide to the content provider a sample preview of the content item. In some cases, the sample preview of the content item can be provided by the coupon delivery module 308 within a specified allowable time deviation from when the coupon and the communication are provided. For example, the coupon delivery module 308 can provide, in conjunction with the coupon and the communication, a user interface that includes a generated sample of a potential advertisement to which the coupon can be applied, such that the content provider can have access to a sample preview of the potential advertisement.

Moreover, the online system 140 can be configured to facilitate acquiring from the content provider an instruction to execute the action related to the content item. For instance, subsequent to being provided with the coupon and the communication, the content provider can decide to taken action with respect to the content item. In this instance, when taking action, the content provider can cause the instruction to be transmitted to and acquired by the online system 140. The online system 140 can be further configured to provide, based on the instruction to execute the action, the content item to at least one user of the online system. For example, the online system 140 can present the content item to one or more targeted users of the online system. Again, many variations are possible.

In some instances, the action can correspond to a first action performed by the content provider via the online system. For example, the coupon can cause a first-time advertiser to advertise via the online system 140. In some cases, the action can correspond to a subsequent action performed by the content provider via the online system. For example, the coupon can cause an advertiser who has not advertised within a certain duration of time to advertise again via the online system 140. Further, in some embodiments, at least a portion of the promotional value that is unused with respect to the content item can be applicable to another content item associated with the content provider. As discussed above, there can be many variations associated with the disclosed technology.

Providing Coupons for Content Providers

Figure 4:
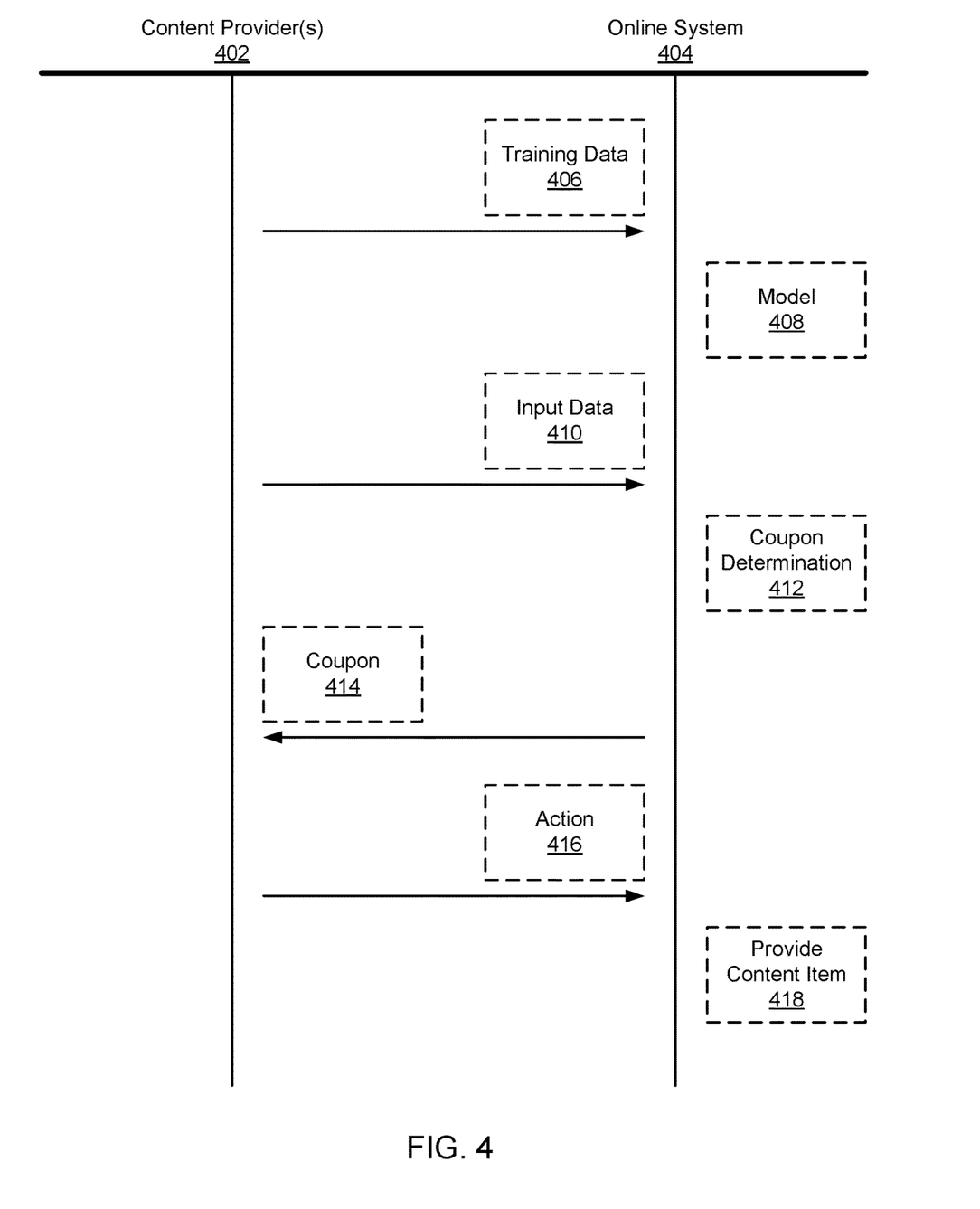
FIG. 4 illustrates an example interaction diagram associated with providing coupons based on information associated with content providers, in accordance with an embodiment.

FIG. 4 illustrates an example interaction diagram associated with providing coupons based on information associated with content providers, in accordance with an embodiment. In the example of FIG. 4, there can be a set of one or more content providers 402 and an online system 404. In some embodiments, each of the one or more content providers 402 of FIG. 4 can be implemented as a third party system 130 in FIG. 1. In some embodiments, the online system 404 of FIG. 4 can be implemented as the online system 140 of FIG. 1.

As shown in the example of the FIG. 4, the online system 404 can acquire training data 406 based on information associated with at least some of the content providers 402. In some cases, the training data 406 can include one or more features extracted, identified, and/or otherwise acquired from the information associated with the content providers 402. Utilizing the training data 406, the online system 404 can train, develop, generate, and/or refine a machine learning model 408, such as a coupon model 408.

Furthermore, the online system 404 can acquire information associated with a particular content provider. Based on the information associated with the particular content provider, the online system 404 can extract one or more features to be utilized as input data 410 for the coupon model 408. Based on the input data 410, the online system 404 can then make a determination 412 regarding whether to provide a coupon 414 to the particular content provider. In this example, the online system 404 can decide to provide the coupon 414 to the particular content provider. The coupon 414 can incentivize, persuade, or encourage the particular content provider to taken action 416 with respect to a content item, such as an advertisement. Accordingly, when the particular content provider has taken action 416 with respect to the content item, the online system 404 can provide the content item 418 to at least one user of the online system 404. It should be appreciated that there can be many variations associated with the disclosed technology.

Figure 5:
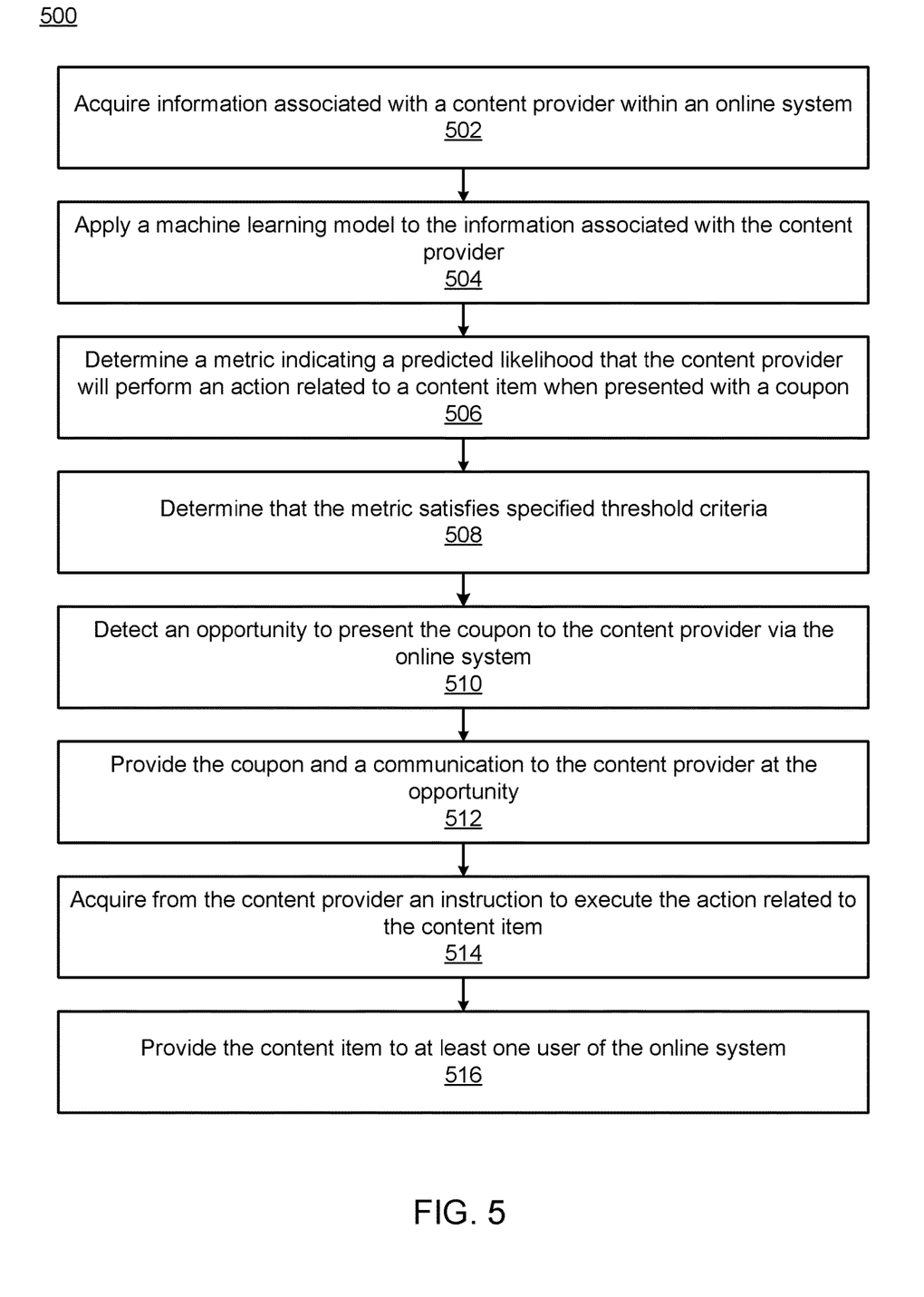
FIG. 5 illustrates a flowchart describing an example process associated with providing coupons based on information associated with content providers, in accordance with an embodiment.

FIG. 5 illustrates a flowchart describing an example process 500 associated with providing coupons based on information associated with content providers, in accordance with an embodiment. It should be understood that there can be additional, fewer, or alternative steps performed in similar or alternative orders, or in parallel, within the scope of the various embodiments unless otherwise stated.

In the example process 500, at block 502, information associated with a content provider within an online system can be acquired. The information associated with the content provider can include data about one or more interactions performed by the content provider. At block 504, a machine learning model can be applied to the information associated with the content provider. At block 506, a metric indicating a predicted likelihood that the content provider will perform an action related to a content item when the content provider is presented with a coupon for the content item can be determined based on applying the machine learning model. The action can be associated with a cost to the content provider. The coupon can provide a promotional value applicable to the cost. At block 508, it can be determined that the metric satisfies specified threshold criteria. At block 510, an opportunity to present the coupon to the content provider via the online system can be detected. At block 512, the coupon and a communication can be provided to the content provider at the opportunity. The communication can encourage the content provider to perform the action related to the content item. At block 514, an instruction to execute the action related to the content item can be acquired from the content provider. At block 516, based on the instruction to execute the action, the content item can be provided to at least one user of the online system. Many variations are possible.

In addition, in some implementations, users can be provided with more features incrementally. For instance, if a content provider already has experience or has gained sufficient experience (e.g., exposure and/or usage at least meeting a threshold amount) with a particular feature, tool, widget, or option, etc., associated with the disclosed technology, the online system can provide the content provider with one or more additional and/or more advanced features, tools, widgets, or options, etc.

Furthermore, in some implementations, various embodiments of the disclosed technology can be utilized to make various predictions, estimations, projections, calculations, and/or determinations, etc. For instance, the coupon model can be utilized to predict or estimate potential revenues generated. In another instance, the coupon model can be utilized to predict or estimate return on investment (ROI), such as incremental ROI.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:
1. A computer-implemented method comprising:
acquiring information associated with a plurality of advertisers;
extracting one or more features based on the information associated with the plurality of advertisers, the one or more features being associated with at least one of engagement data associated with the plurality of advertisers, expenditure data associated with the plurality of advertisers, or page data associated with the plurality of advertisers;
training, based on the one or more features, a machine learning model to determine a metric indicating a predicted likelihood that an advertiser performs an action related to a content item when the advertiser is presented with a coupon for the content item, wherein the action is associated with a cost to the advertiser, and wherein the coupon provides a promotional value applicable to the cost;
acquiring, by an online system, information associated with the advertiser within the online system;
extracting one or more features based on information associated with the advertiser, the one or more features being associated with at least one of engagement data associated with the advertiser, expenditure data associated with the advertiser, or page data associated with the advertiser;
applying, by the online system, the machine learning model to the one or more features;
determining, by the online system, based on applying the machine learning model, the metric;
determining, by the online system, based on applying the machine learning model, the promotional value provided by the coupon;
determining, based on applying the machine learning model, a second metric indicating a predicted likelihood that the advertiser performs the action even when the cost associated with the action is greater than the promotional value provided by the coupon;
determining, by the online system, that the metric satisfies specified threshold criteria;
determining, by the online system, that the second metric satisfies specified threshold criteria different from those of the metric;
detecting, by the online system, based on the metric satisfying specified threshold criteria and the second metric satisfying the different specified threshold criteria, an opportunity to present the coupon to the advertiser via the online system, wherein detecting the opportunity includes detecting a command from the advertiser to create the content item via the online system;
providing, by the online system, based on the detected opportunity, the coupon and a communication to the advertiser at the opportunity, the communication providing information to the advertiser about performing the action related to the content item;
acquiring, by the online system, from the advertiser an instruction to execute the action related to the content item; and
providing, by the online system, based on the instruction to execute the action, the content item to at least one target user of the online system, the target user being a user of the online system that interacts with the content item of the advertiser.

2. The method of claim 1, wherein the advertiser corresponds to an admin of a page within the online system, and wherein information associated with the advertiser includes one or more interactions performed by the advertiser with respect to the page within the online system.

3. The method of claim 1, further comprising:
providing to the advertiser a sample preview of the content item, the sample preview of the content item being provided within a specified time deviation from when the coupon and the communication are provided.

4. The method of claim 1, wherein the content item corresponds to an advertisement, wherein the action corresponds to a spending action related to advertising the advertisement via the online system, wherein the cost is associated with a spending amount for advertising the advertisement, and wherein the promotional value provides at least one of a discount or a monetary value.

5. The method of claim 4, wherein the spending amount is capable of being increased by the advertiser but incapable of being decreased by the advertiser without decreasing the promotional value.

6. The method of claim 1, wherein the action corresponds to at least one of a first action performed by the advertiser via the online system or a subsequent action performed by the advertiser via the online system.

7. The method of claim 1, wherein at least a portion of the promotional value that is unused with respect to the content item is applicable to another content item associated with the advertiser.

8. A system comprising:
at least one processor; and
a memory storing instructions that, when executed by the at least one processor, cause the system to perform:
acquiring information associated with a plurality of advertisers;
extracting one or more features based on the information associated with the plurality of advertisers, the one or more features being associated with at least one of engagement data associated with the plurality of advertisers, expenditure data associated with the plurality of advertisers, or page data associated with the plurality of advertisers;
training, based on the one or more features, a machine learning model to determine a metric indicating a predicted likelihood that an advertiser performs an action related to a content item when the advertiser is presented with a coupon for the content item, wherein the action is associated with a cost to the advertiser, and wherein the coupon provides a promotional value applicable to the cost;
acquiring information associated with the advertiser within an online system;
extracting one or more features based on information associated with the advertiser, the one or more features being associated with at least one of engagement data associated with the advertiser, expenditure data associated with the advertiser, or page data associated with the advertiser;
applying the machine learning model to the one or more features;
determining, based on applying the machine learning model, the metric;
determining, based on applying the machine learning model, the promotional value provided by the coupon;
determining, based on applying the machine learning model, a second metric indicating a predicted likelihood that the advertiser performs the action even when the cost associated with the action is greater than the promotional value provided by the coupon;
determining that the metric satisfies specified threshold criteria;
determining that the second metric satisfies specified threshold criteria different from those of the metric;
detecting an opportunity to present the coupon to the advertiser via the online system, wherein detecting the opportunity includes detecting a command from the advertiser to create the content item via the online system;
providing the coupon and a communication to the advertiser at the opportunity, the communication providing information to the advertiser about performing the action related to the content item;
acquiring from the advertiser an instruction to execute the action related to the content item; and
providing, based on the instruction to execute the action, the content item to at least one target user of the online system, the target user being a user of the online system that interacts with the content item of the advertiser.

9. The system of claim 8, wherein the advertiser corresponds to an admin of a page within the online system, and wherein information associated with the advertiser includes one or more interactions performed by the advertiser with respect to the page within the online system.

10. A non-transitory computer-readable storage medium including instructions that, when executed by at least one processor of a computing system, cause the computing system to perform a method comprising:
acquiring information associated with a plurality of advertisers;
extracting one or more features based on the information associated with the plurality of advertisers, the one or more features being associated with at least one of engagement data associated with the plurality of advertisers, expenditure data associated with the plurality of advertisers, or page data associated with the plurality of advertisers;
training, based on the one or more features, a machine learning model to determine a metric indicating a predicted likelihood that an advertiser performs an action related to a content item when the advertiser is presented with a coupon for the content item, wherein the action is associated with a cost to the advertiser, and wherein the coupon provides a promotional value applicable to the cost;
acquiring information associated with the advertiser within an online system;
extracting one or more features based on information associated with the advertiser, the one or more features being associated with at least one of engagement data associated with the advertiser, expenditure data associated with the advertiser, or page data associated with the advertiser;
applying the machine learning model to the one or more features;
determining, based on applying the machine learning model, the metric;
determining, based on applying the machine learning model, the promotional value provided by the coupon;
determining based on applying the machine learning model, a second metric indicating a predicted likelihood that the advertiser performs the action even when the cost associated with the action is greater than the promotional value provided by the coupon;
determining that the metric satisfies specified threshold criteria;
determining that the second metric satisfies specified threshold criteria different from those of the metric;
detecting an opportunity to present the coupon to the advertiser via the online system, wherein detecting an opportunity includes detecting a command from the advertiser to create the content item via the online system;
providing the coupon and a communication to the advertiser at the opportunity, the communication providing information to the advertiser about performing the action related to the content item;
acquiring from the advertiser an instruction to execute the action related to the content item; and
providing, based on the instruction to execute the action, the content item to at least one target user of the online system, the target user being a user of the online system that interacts with the content item of the advertiser.

11. The non-transitory computer-readable storage medium of claim 10, wherein the advertiser corresponds to an admin of a page within the online system, and wherein information associated with the advertiser includes one or more interactions performed by the advertiser with respect to the page within the online system.

12. The computer-implemented method of claim 1, wherein training the machine learning model to determine the metric comprises:
   forming a validation set that includes information associated with the advertiser;
   applying the machine learning model to the validation set to determine the metric;
   quantifying an accuracy measurement based on precision and recall of the metric; and
   iteratively training the machine learning model based on the accuracy measurement.

13. The system of claim 8, wherein training the machine learning model to determine the metric comprises:
   forming a validation set that includes information associated with the advertiser;
   applying the machine learning model to the validation set to determine the metric;
   quantifying an accuracy measurement based on precision and recall of the metric; and
   iteratively training the machine learning model based on the accuracy measurement.

14. The non-transitory computer-readable storage medium of claim 10, wherein training the machine learning model to determine the metric comprises:
   forming a validation set that includes information associated with the advertiser;
   applying the machine learning model to the validation set to determine the metric;
   quantifying an accuracy measurement based on precision and recall of the metric; and
   iteratively training the machine learning model based on the accuracy measurement.

* * * * *

UNITED STATES PATENT AND TRADEMARK OFFICE
CERTIFICATE OF CORRECTION

PATENT NO. : 10,891,663 B2
APPLICATION NO. : 15/640312
DATED : January 12, 2021
INVENTOR(S) : Moniz et al.

Page 1 of 1

It is certified that error appears in the above-identified patent and that said Letters Patent is hereby corrected as shown below:

In the Claims

In Column 18, in Claim 2, Line 45, delete "The method" and insert -- The computer-implemented method --, therefor.

In Column 18, in Claim 3, Line 50, delete "The method" and insert -- The computer-implemented method --, therefor.

In Column 18, in Claim 4, Line 55, delete "The method" and insert -- The computer-implemented method --, therefor.

In Column 18, in Claim 5, Line 62, delete "The method" and insert -- The computer-implemented method --, therefor.

In Column 18, in Claim 6, Line 66, delete "The method" and insert -- The computer-implemented method --, therefor.

In Column 19, in Claim 7, Line 3, delete "The method" and insert -- The computer-implemented method --, therefor.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*